(12) United States Patent
Simon et al.

(10) Patent No.: US 11,499,482 B2
(45) Date of Patent: Nov. 15, 2022

(54) PLANETARY GEARBOX ASSEMBLY FOR A TURBINE ENGINE

(71) Applicant: SAFRAN TRANSMISSION SYSTEMS, Colombes (FR)

(72) Inventors: Adrien Louis Simon, Saint-Denis (FR); Simon Loic Clement Lefebvre, Paris (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 43 days.

(21) Appl. No.: 16/793,999

(22) Filed: Feb. 18, 2020

(65) Prior Publication Data

US 2020/0263613 A1 Aug. 20, 2020

(30) Foreign Application Priority Data

Feb. 20, 2019 (FR) ...................................... 1901704

(51) Int. Cl.
*F02C 7/36* (2006.01)
*F01D 25/04* (2006.01)
*F02C 7/06* (2006.01)

(52) U.S. Cl.
CPC ................ *F02C 7/36* (2013.01); *F01D 25/04* (2013.01); *F02C 7/06* (2013.01); *F05D 2220/323* (2013.01); *F05D 2240/10* (2013.01)

(58) Field of Classification Search
CPC ....................................................... F02C 7/36
See application file for complete search history.

(56) References Cited

U.S. PATENT DOCUMENTS

2004/0259679 A1  12/2004  Becquerelle et al.
2011/0252907 A1  10/2011  Takenaka et al.
(Continued)

FOREIGN PATENT DOCUMENTS

EP  1464869 A1  10/2004
FR  2853382 A1  10/2004
(Continued)

OTHER PUBLICATIONS

Espacenet, JP 2009-058002, Specification English Translation (Year: 2009).*
(Continued)

*Primary Examiner* — Igor Kershteyn
*Assistant Examiner* — John S Hunter, Jr.
(74) *Attorney, Agent, or Firm* — Womble Bond Dickinson (US) LLP

(57) ABSTRACT

A planetary gear train speed reduction gear planetary carrier (130) assembly and an elastically deformable annular member (160), for a turbine engine, in particular for an aircraft. The planetary carrier (130) has a general annular shape about an axis X. The annular member (160) extends about the axis X, and is fixed to the planetary carrier and configured to be fixed to a stator element (162) of the turbine engine ensuring a flexible connection between the planetary carrier and the stator element. The planetary carrier carries a series of protruding teeth (180) extending substantially radially outwards with respect to the axis X. Each of these teeth has first opposite side faces (180*a*, 180*b*) extending into planes passing through the axis X capable of engaging by abutment in the circumferential direction with the stator element. A vibration absorption system is inserted between the first faces and the stator element.

11 Claims, 14 Drawing Sheets

(56) References Cited

U.S. PATENT DOCUMENTS

2013/0023378 A1 1/2013 McCune et al.
2013/0225353 A1 8/2013 Gallet et al.

FOREIGN PATENT DOCUMENTS

| FR | 2987416 A1 | 8/2013 |
| FR | 3041054 A1 | 3/2017 |
| FR | 3052213 A1 | 12/2017 |
| JP | 2009-058002 A | 3/2009 |
| WO | 2010/092263 A1 | 8/2010 |

OTHER PUBLICATIONS

Preliminary Research Report and Written Opinion received for French Application No. 1901704, dated Oct. 28, 2019, 19 pages (6 pages of English Translation and 13 pages of Original Document).

* cited by examiner

[Fig.1]
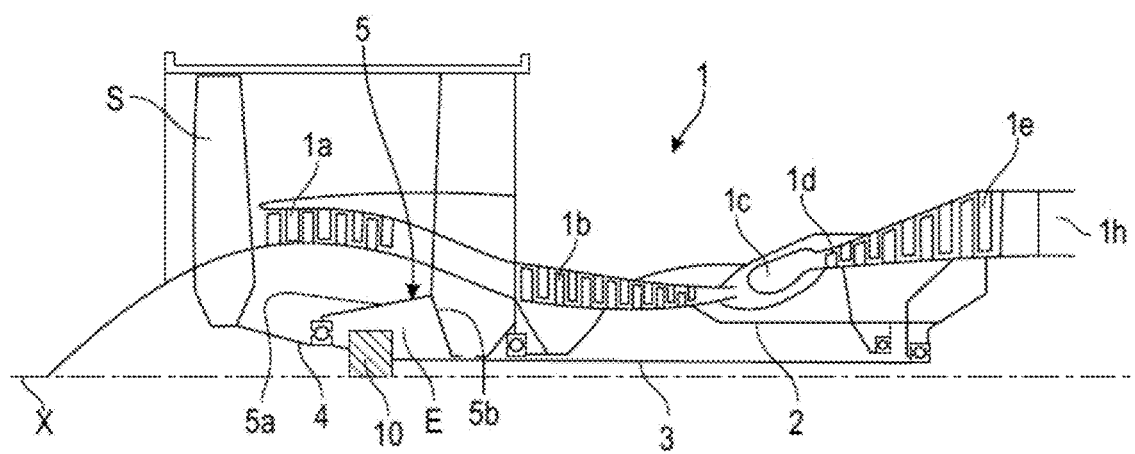

[Fig.2]
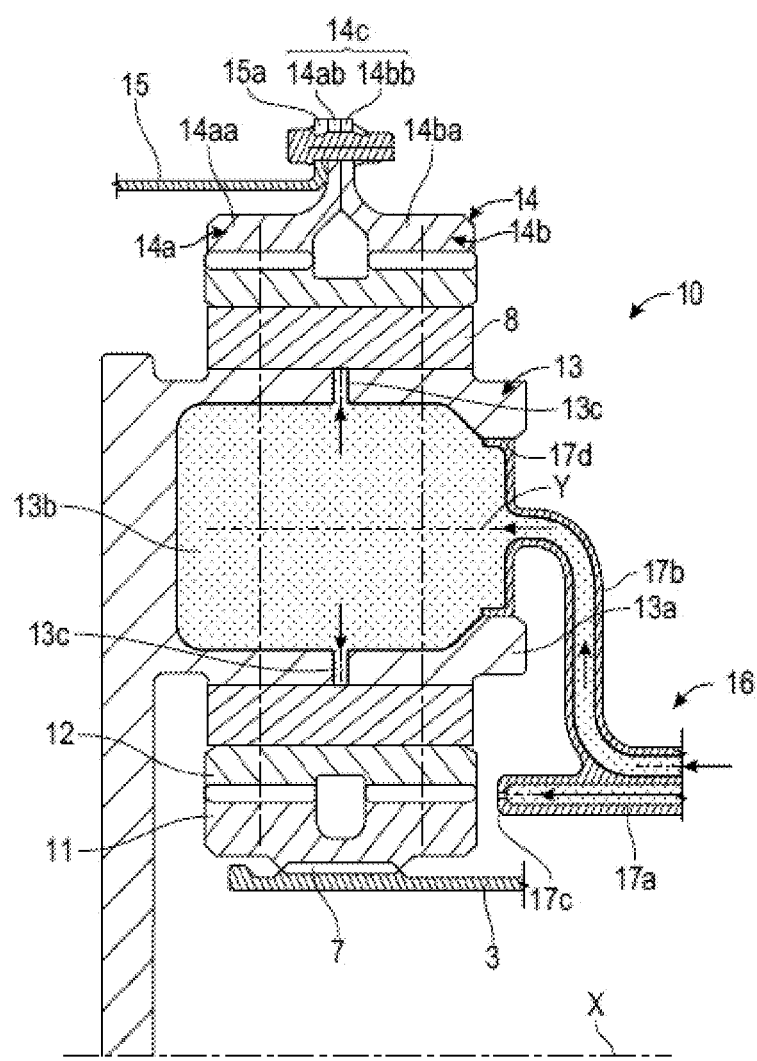

[Fig.3]
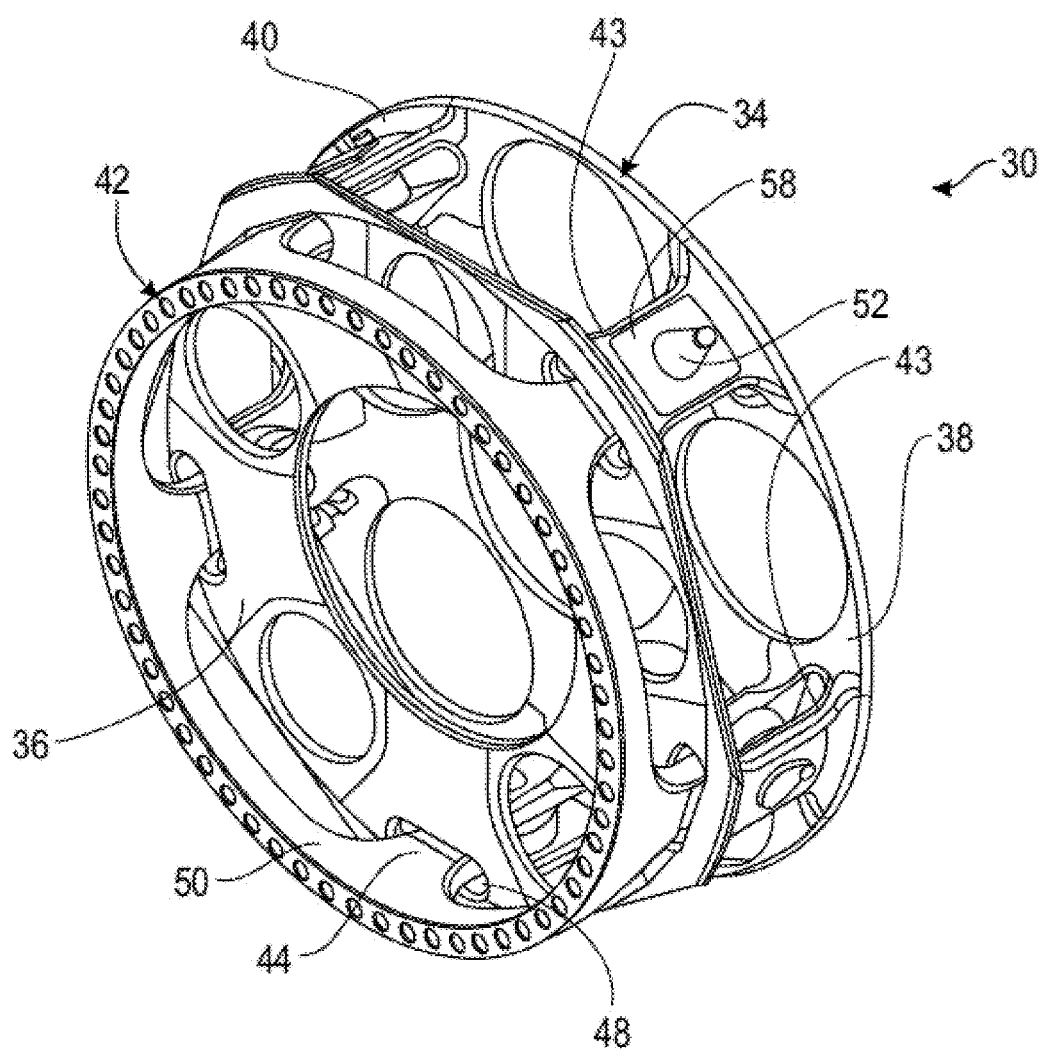

[Fig.4]
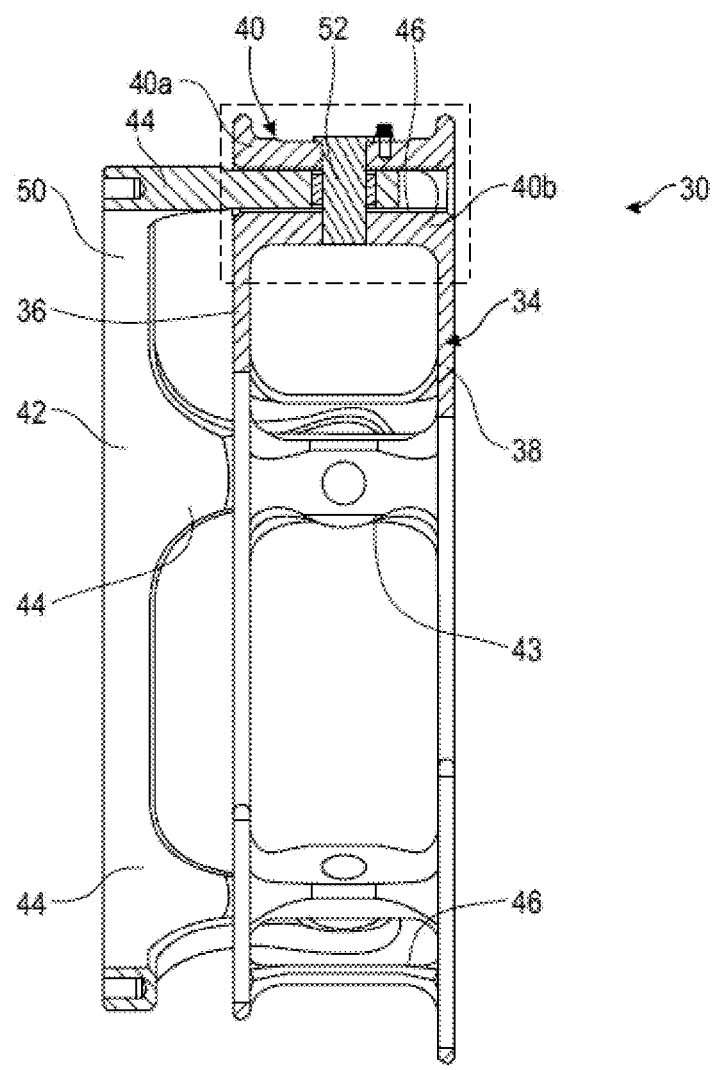

[Fig.5]
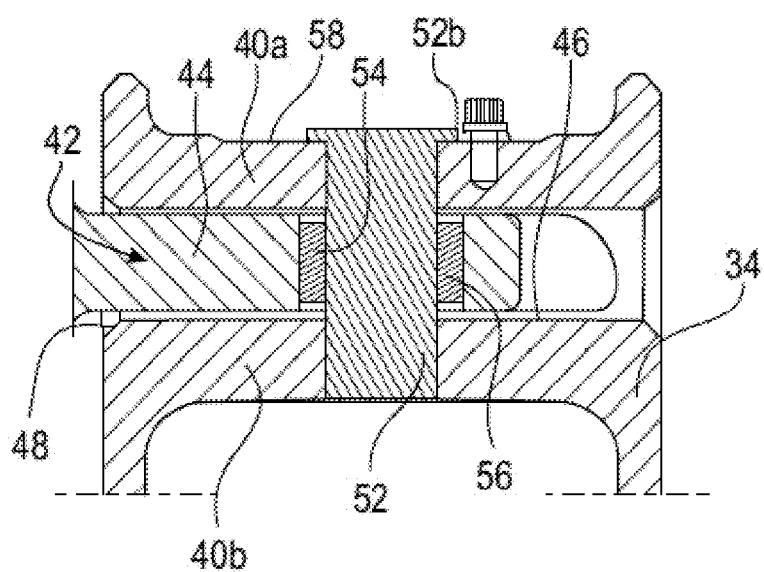

[Fig.6]
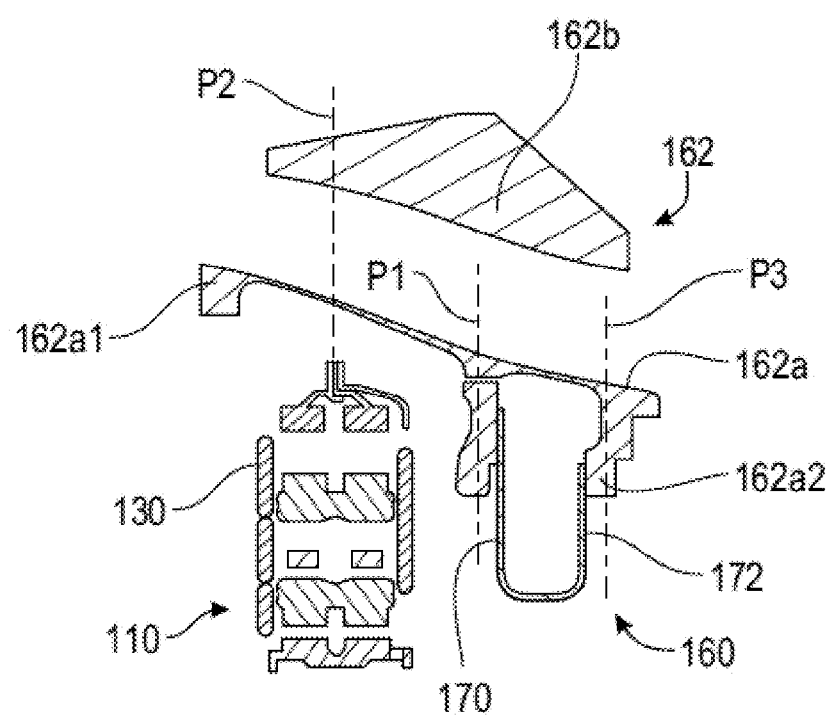

[Fig.7]
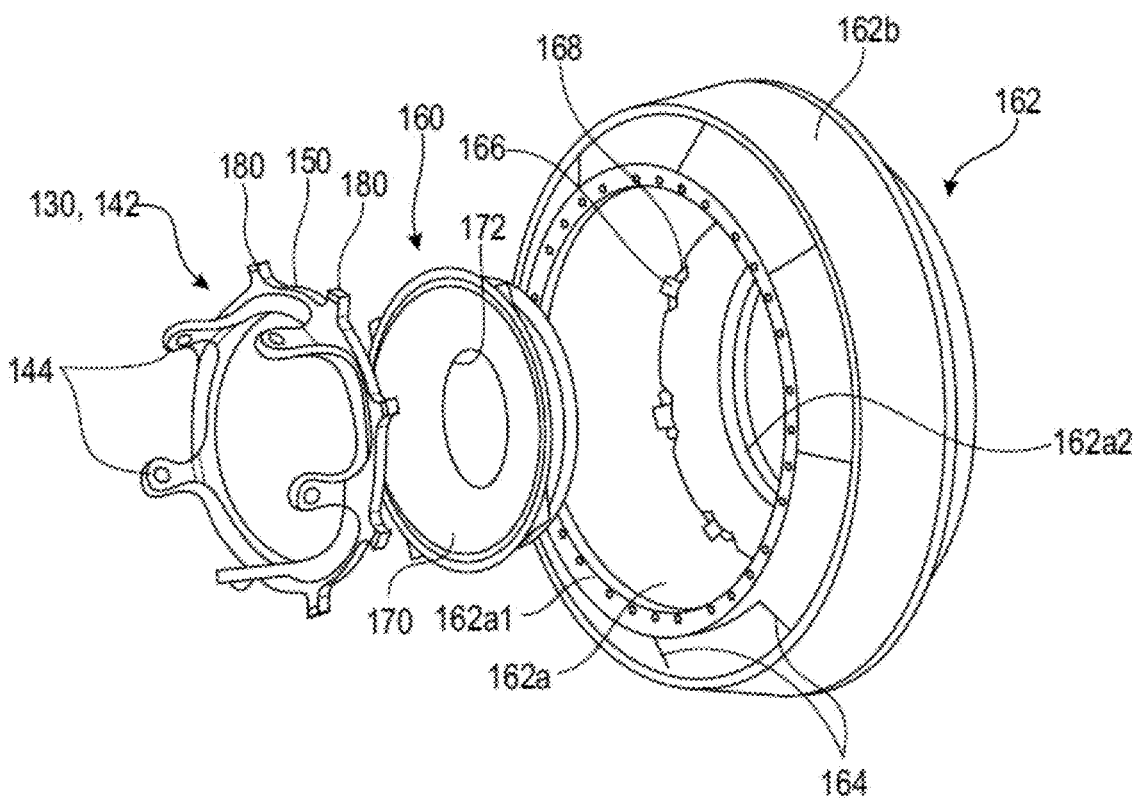

[Fig.8]
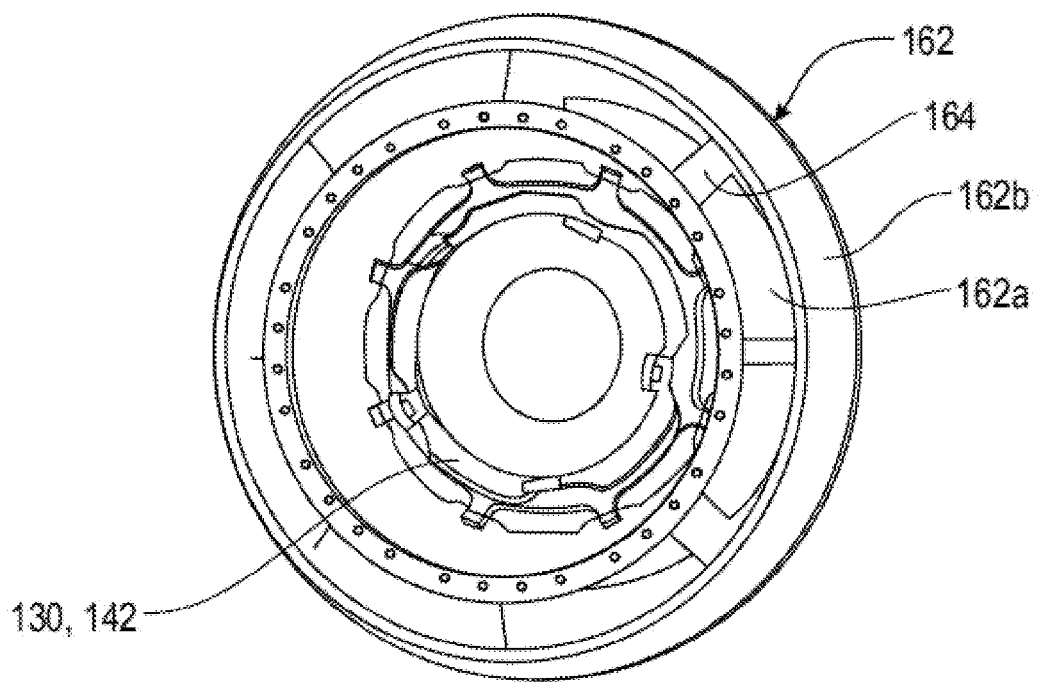

[Fig.9]
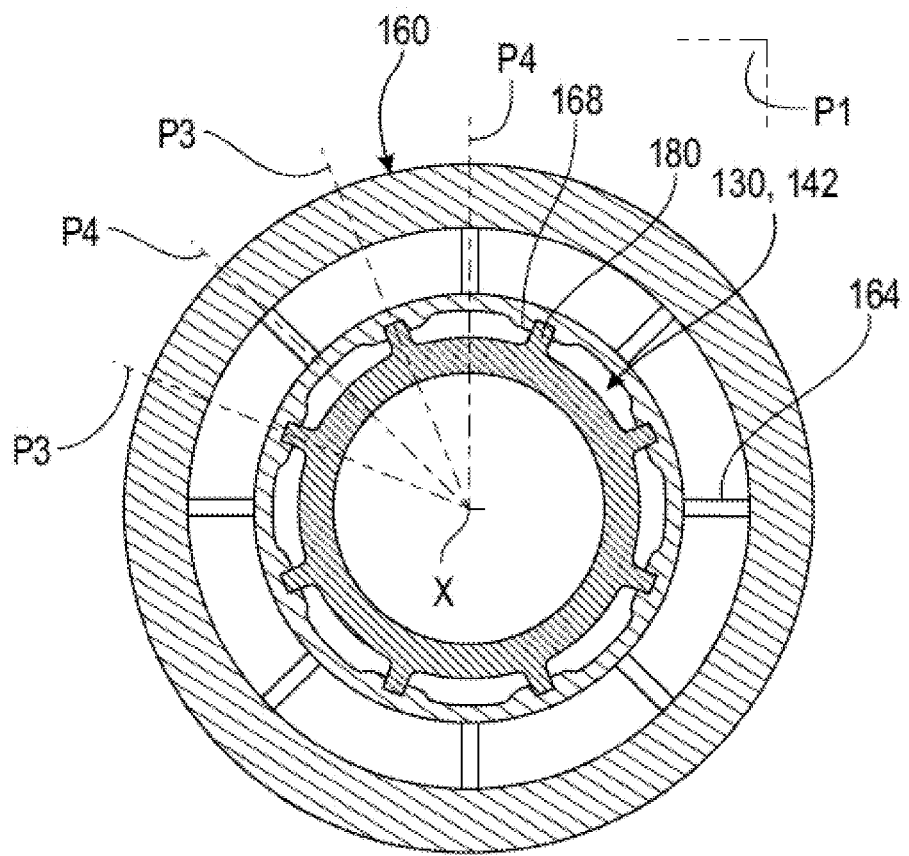

[Fig.10]
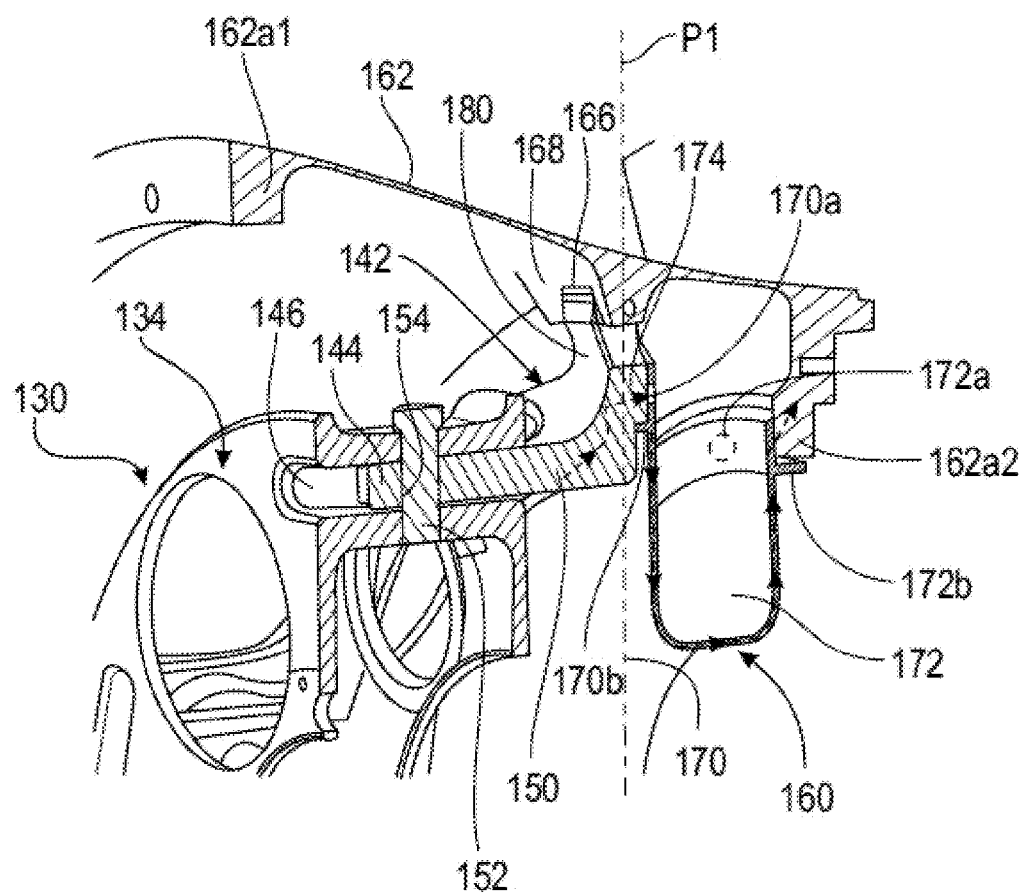

[Fig.11]
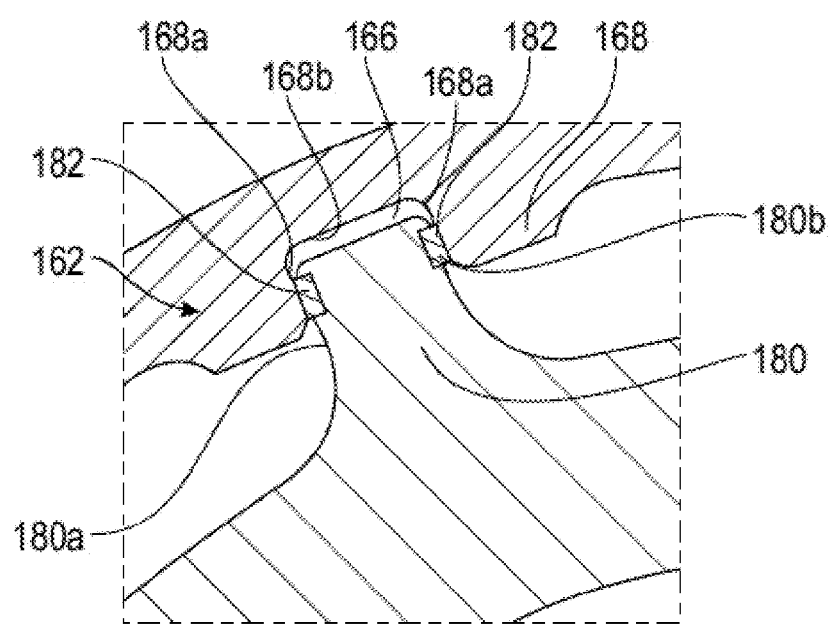

[Fig.12]
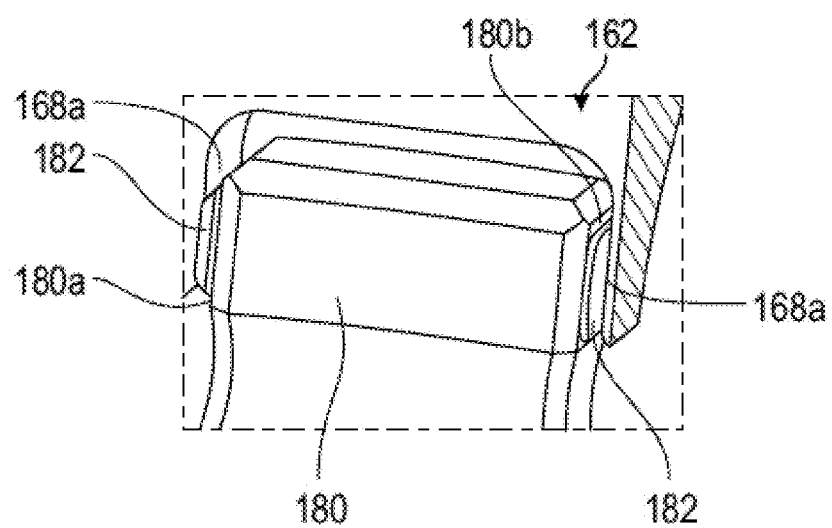

[Fig.13]
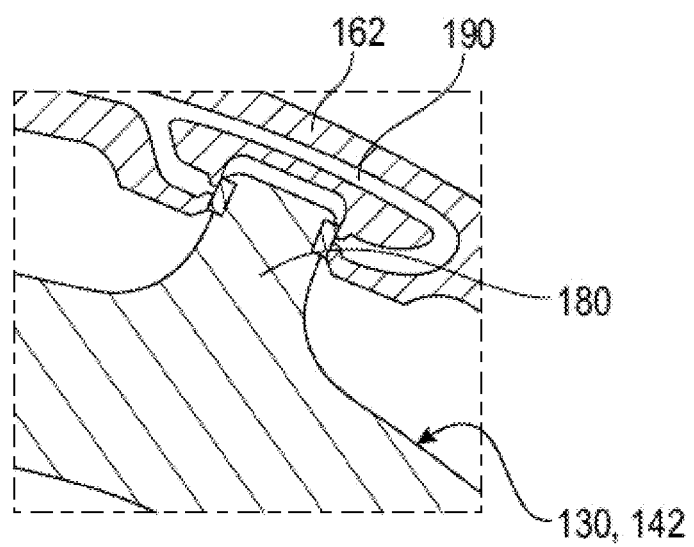

[Fig.14]
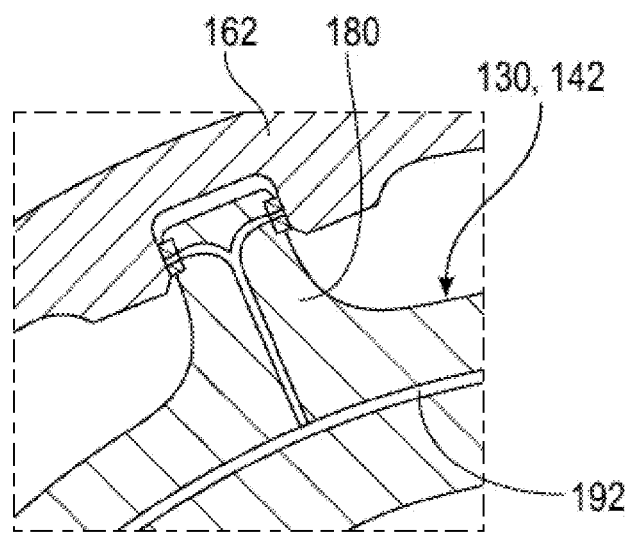

PLANETARY GEARBOX ASSEMBLY FOR A TURBINE ENGINE

TECHNICAL FIELD OF THE INVENTION

The present invention relates to the field of planetary gear train speed reduction gears for turbine engines, in particular, of aircraft.

TECHNICAL BACKGROUND

The state of the art comprises, in particular, documents WO-A1-2010/092263, FR-A1-2 987 416, EP-A1-1 464 869, FR-A1-3 041 054 FR-A1-2 853 382, FR-A1-3 052 213, JP-A-2009 058002, US-A1-2013/023378 and US-A1-2011/252907.

The role of a mechanical reduction gear is to modify the speed and torque ratio between the input axis and the output axis of a mechanism.

New generations of bypass turbine engines, in particular those having a high dilution rate, comprise a mechanical reduction gear to drive the shaft of a fan. Usually, the reduction gear aims to transform the rotation speed, termed rapid rotation speed, of the shaft of a power turbine into a slower rotation speed for the shaft driving the fan.

Such a reduction gear comprises a central pinion, termed sun gear, a ring gear and pinions termed planetary gears, which are in contact between the sun gear and the ring gear. The planetary gears are supported by a chassis, termed planetary carrier. The sun gear, the ring gear and the planetary carrier are planetary, as the axes of revolution thereof coincide with the longitudinal axis X of the turbine engine. The planetary gears each have a different axis of revolution, evenly distributed over the same operating diameter about the planetary axis. These axes are parallel to the longitudinal axis X.

There are several reduction gear architectures. In the state of the art of bypass turbine engines, reduction gears are of the planetary or epicyclic type. There are, in other similar applications, architectures termed differential or "compound".

In a planetary reduction gear, the planetary carrier is fixed, and the ring gear constitutes the output shaft of the device which rotates in the reverse direction of the sun gear.

In an epicyclic reduction gear, the ring gear is fixed, and the planetary carrier constitutes the output shaft of the device which rotates in the same direction as the sun gear.

In a differential reduction gear, no element is fixed in rotation. The ring gear rotates in the opposite direction to the sun gear and the planetary carrier.

Reduction gears can comprise one or more meshing stages. This meshing is ensured in different manners, like by contact, by friction or also by magnetic field.

There are several types of meshing by contact, like with spur gearing or chevron gearing.

The planetary carrier of a reduction gear can be presented in the form of a cage wherein the sun gear, the planetary gears, the bearings for guiding the planetary gears are housed, as well as means for lubricating the planetary gears and the sun gear. The sun gear comprises inner splines for coupling with a first shaft of the turbine engine, and the cage of the planetary carrier is integral with a cage carrier which comprises a cylindrical portion comprising outer splines for coupling to another shaft.

The connection of the cage to the cage carrier is generally rigid. As a variant, a technology can be envisaged, in which the cage is connected to the cage carrier by flexible connections, such as described in document EP-A1-1 464 869. In such a case, the cage carrier comprises an annular row of axial fingers which are connected by flexible connections to the cage.

As mentioned above, a planetary reduction gear has a planetary carrier, fixed and connected to a stator element of the turbine engine by interface elements. The distribution of loads to the different planetary gears of the reduction gear requires a certain flexibility of these interface elements. This flexibility, however, goes against the dynamic situation of the reduction gear in the engine.

The present invention proposes an improvement which provides a simple, effective and economical solution to this problem.

SUMMARY OF THE INVENTION

The invention relates to an assembly comprising a planetary gear train speed reduction gear planetary carrier and an elastically deformable annular member, for a turbine engine, in particular of an aircraft,
the planetary carrier, having a general annular shape about an axis X, and
the annular member extending about the axis X, this member being fixed to said planetary carrier and configured to be fixed to a stator element of the turbine engine ensuring a flexible connection between the planetary carrier and said stator element,
characterised in that the planetary carrier carries a series of protruding teeth extending substantially radially outwards with respect to said axis X, each of these teeth comprising opposite first side faces extending into planes passing through the axis X and capable of engaging by abutment in the circumferential direction with said stator element, absorption vibration systems, of the vibration absorption pads and/or absorption oil film type, being inserted between said first faces and said stator element.

The present invention is therefore applicable in the context of a reduction gear termed planetary reduction gear, i.e. in which the planetary carrier is connected to a stator element of the turbine engine and is therefore fixed in the engine marker. This solution is compatible with any type of gearing of the sun gear, of the planetary gears and of the ring gear. The solution proposed below is compatible with any type of planetary carrier, whether it is one-piece or of cage and cage carrier type. This solution is finally compatible with any type of planetary gear bearing, whether it is composed of rolling elements, of a hydrodynamic bearing, etc.

In the present invention, the planetary carrier is connected to the stator element by a flexible connection comprising an elastic member. This elastic member can be designed to confer a flexibility in the axial, radial and torsion direction to the connection. This flexible connection also ensures transmission of the forces between the planetary carrier and the stator element. Beyond a certain torsion force threshold and therefore torque about the axis X, the elastic member is likely to be broken. To avoid this, the planetary carrier comprises teeth which are capable of engaging by abutment in the circumferential direction with the stator element. These teeth are thus intended to take over the transmission of the forces in the abovementioned case, where the torsion forces transmitted by the planetary carrier would be too much and would be likely to damage the elastic member.

The teeth are advantageously free to be moved radially and axially with respect to the stator element.

The absorption systems make it possible to absorb the vibrations to which the operating planetary carrier is subjected.

The cage carrier according to the invention can comprise one or more of the following features, taken individually from one another, or combined with one another:

the planetary carrier is one-piece or comprises a cage and a cage carrier, the cage carrier comprises an annular body extending about the axis X and carrying the series of teeth as well as a series of protruding fingers, extending along the axis X and distributed about this axis X, each of these fingers comprising, at the free end thereof opposite the body, a recess for mounting a bearing pin for the connection of the cage carrier to the cage, this cage comprising, at the periphery thereof of the axial housings in which the fingers are received and which are passed through by the bearing pins, the teeth and the fingers are at least partially formed of unitary construction with the body; this makes it possible to simplify the production and the assembly of the cage carrier, calculations have shown, that it was does not matter if the number of teeth is different from the number of fingers; the integration to the engine has shown that it was preferable for the structure to have a number of teeth as a multiple of the number of casing arms; however, if the number of arms is equal to the number of fingers, there would be as many teeth as fingers, and as arms, each of the first side faces carries a pad, fixed or not, having a vibration absorption function; the teeth are thus circumferentially spaced from the stator element and are not intended to abut against this stator element in normal operation; the absorption pads, the possible vibrations to which the planetary carrier would be subjected in operation to avoid transmitting them to the stator element; these pads can be made of elastomer or any other suitable vibration isolation material, the planetary carrier comprises an inner duct for circulating oil and for supplying oil to said first side faces forming an absorption oil film at the level of each of these faces; thus, an absorption film of the "squeeze film" type well-known in the field of turbine engines is obtained, to absorb vibrations and avoid the transmission thereof between two parts; in an embodiment, the planetary carrier can comprise an oil circuit; in the case of using elastomer pads, the absorption film is not necessarily necessary, said elastic member has, in the longitudinal cross-section, a general U-shape, of which the opening is oriented radially outwards, this member comprising a first annular flange applied axially and fixed on the planetary carrier, and a second annular flange configured to be applied axially and fixed on the stator element; the member thus has a simple shape; this shape is not, however, limiting, said first flange comprises a centring cylindrical groove oriented towards the planetary carrier and engaging with a cylindrical surface of the planetary carrier, and/or said second flange comprises a centring cylindrical groove oriented in an opposite direction and configured to engage with a cylindrical surface of said stator element; these grooves ensure the centring of the member opposite the planetary carrier, on the one hand, and of the stator element, on the other hand, and guarantee the axial alignment of these operating parts, said planetary carrier comprises tapped orifices for screwing fixing screws of said first flange to the planetary carrier; the planetary carrier does not thus comprise any dedicated flange for fixing to the member which is, on the contrary, directly fixed on the planetary carrier, which reduces the volume of the assembly, said teeth and said tapped orifices are substantially located in the same plane P1 perpendicular to said axis X; this can also make it possible to optimise the volume of the assembly, the planetary carrier defines a space for housing a central sun gear of axis of rotation X and an annular row of planetary gears arranged about the axis X and meshed with the sun gear, as well as with a ring gear intended to surround the planetary carrier.

The present invention also relates to a turbine engine module, comprising an assembly such as described above, and a stator element which comprises two annular ferrules, respectively outer and inner, one extending around the other and around said axis X, the ferrules being connected to one another by arms, the inner ferrule extending at least partially around said planetary carrier and comprising, at the inner periphery thereof, a series of housings extending substantially radially and in which the teeth of the planetary carrier are engaged, these teeth being capable of being moved radially in these housings and the first side faces thereof being capable of abutting in the circumferential direction on second side faces facing the housings.

The module according to the invention can comprise one or more of the following features, taken individually from one another, or combined with one another:

the stator element can comprise absorption pads on said second side faces (made of polymer or any other vibration-absorbing material), and/or an inner duct for circulating oil and for supplying oil to said second side faces forming an absorption oil film between said first and second side faces; an absorption film of the "squeeze film" type is thus obtained, as mentioned above, said stator element is an inlet casing of the turbine engine, said ferrules together defining a flow duct for gas flow, said arms comprise leading edges located in a plane P2 perpendicular to said axis X and trailing edges located in a plane P3 perpendicular to said axis X, the housings and the fingers being located in a plane P1 located between the planes P2 and P3; this can make it possible to optimise the volume of the module.

BRIEF DESCRIPTION OF THE FIGURES

Other features and advantages will emerge from the following description of a non-limiting embodiment of the invention in reference to the appended drawings, in which:

FIG. 1 is a schematic, cross-sectional, axial view of a turbomachine using the invention, FIG. 2 is a schematic, cross-sectional, axial view of an epicyclic gear train reduction gear, FIG. 3 is a perspective view of a cage and cage carrier assembly forming a reduction gear planetary carrier, FIG. 4 is a cross-sectional, axial view of the planetary carrier of FIG. 3, FIG. 5 is a larger scale view of a detail of FIG. 4, FIG. 6 is a cross-sectional, axial view of a turbine engine module, comprising a reduction gear, a stator element, and an elastic member for connecting the reduction gear to the stator element, FIG. 7 is an exploded, perspective view of a portion of the module of FIG. 6, FIG. 8 is a perspective view of a portion of the module of FIG. 6, FIG. 9 is a transversal cross-sectional view of a portion of a module of FIG. 6, FIG. 10 is a cross-sectional, longitudinal and perspective view of a portion of the module of FIG. 6, FIG. 11 is a larger scale view of a detail of FIG. 9 and shows a finger equipped with vibration absorption pads, FIG. 12 is a perspective view of the finger and pads of FIG. 11, FIG. 13 is a view similar to that of FIG. 11 and shows an variant embodiment of the vibration absorption device equipped with an above named "squeeze film" system, and FIG. 14 is a view similar to that of FIG. 11 and shows another variant embodiment of the vibration absorption device equipped with an above named "squeeze film" system.

DETAILED DESCRIPTION OF THE INVENTION

FIG. 1 describes a turbine engine 1 which comprises, conventionally, a fan S, a low-pressure compressor 1a, a high-pressure compressor 1b, an annular combustion chamber 1c, a high-pressure turbine 1d, a low-pressure turbine 1e and an exhaust pipe 1h. The high-pressure compressor 1b and the high-pressure turbine 1d are connected by a high-pressure shaft 2 and form with it a high-pressure (HP) body. The low-pressure compressor 1a and the low-pressure turbine 1e are connected by a low-pressure shaft 3 and form with it a low-pressure (LP) body.

The fan S is driven by a fan shaft 4 which is connected to the LP shaft 3 by means of a reduction gear 10. This reduction gear is generally of the planetary or epicyclic type.

Although the following description relates to a reduction gear of the planetary or epicyclic type, it also applies to a mechanical differential, in which the three main components thereof, which are the planetary carrier, the ring gear and the sun gear, are mobile in rotation, the rotation speed of one of these components depends in particular on the difference in speeds of the two other components.

The reduction gear 10 is positioned in the front portion of the turbine engine. A fixed structure schematically comprising, here, an upstream portion 5a and a downstream portion 5b which forms the engine casing or stator 5 is arranged so as to form an enclosure E surrounding the reduction gear 10. This enclosure E is here closed upstream by seals at the level of a bearing making it possible for the passage of the fan shaft 4, and downstream by seals at the level of the passage of the LP shaft 3.

FIG. 2 shows a portion of a reduction gear 10 which can take the form of different architectures, according to whether certain parts are fixed or in rotation. At the inlet, the reduction gear 10 is connected to the LP shaft 3, for example, by way of splines 7. Thus, the LP shaft 3 drives a planetary pinion termed the sun gear 11. Conventionally, the sun gear 11 of which the axis of rotation is combined with the axis X of the turbine engine, drives a series of pinions termed planetary gears 12, which are evenly distributed over the same diameter about the axis of rotation X. This diameter is equal to double the operating distance between sun gear 11 and planetary gears 12. The number of planetary gears 12 is generally defined between three and seven for this type of application.

All of the planetary gears 12 are supported by a chassis termed planetary carrier 13. Each planetary gear 12 rotates about its own axis Y, and meshes with the ring gear 14.

At the outlet of the reduction gear 10, the following occur:

In an epicyclic configuration, all of the planetary gears 12 drive the planetary carrier 13 in rotation about the axis X of the turbine engine. The ring gear 14 is fixed to the engine casing or stator 5 via a ring gear carrier 15 and the planetary carrier 13 is fixed to the fan shaft 4.

In a planetary configuration, all of the planetary gears 12 are supported by a planetary carrier 13 which is fixed to the engine casing or stator 5. Each planetary gear drives the ring gear, which is attached to the fan shaft 4 via a ring gear carrier 15.

Each planetary gear 12 is mounted free for rotation using a bearing 8, for example of roller or hydrodynamic bearing type. Each bearing 8 is mounted on one of the physical axes 13a of the planetary carrier 13 and all the axes are positioned against one another using one or more structural chassis of the planetary carrier 13. There is a number of axes and bearings equal to the number of planetary gears. For operating, mounting, production, control, repair or replacement reasons, the physical axes 13a and the chassis can be separated into several parts.

For the same reasons cited above, the gearing of a reduction gear can be separated into several helices. In this example, the operation of a reduction gear 10 with several helices with a ring gear separated into two half-ring gears is detailed:

A front half-ring gear 14a consisting of a rim 14aa and of a mounting half-flange 14ab. On the rim 14aa, the front helix of the gearing of the reduction gear is located. This front helix meshes with that of the planetary gear 12 which meshes with that of the sun gear 11.

A rear half-ring gear 14b consisting of a rim 14ba and of a mounting half-flange 14bb. On the rim 14ba the rear helix of the gearing of the reduction gear is located. This rear helix meshes with that of the planetary gear 12 which meshes with that of the sun gear 11.

The mounting half-flange 14ab of the front ring gear 14a and the mounting half-flange 14bb of the rear ring gear 14b form the mounting flange 14c of the ring gear. The ring gear 14 is fixed to the ring gear carrier 15 by assembling the mounting flange 14c of the ring gear and the mounting flange 15a of the ring gear carrier using a bolted mounting, for example. Below, a half-flange can be termed a flange.

The arrows of FIG. 2 describe the movement of the oil in the reduction gear 10. The oil arrives in the reduction gear 10 from the stator portion 5 in the distributor 16 by different means which will not be specified in this view, as they are specific to one or more types of architecture. The distributor 16 is separated into two portions, generally each repeated by the same number of planetary gears. The injectors 17a have the function of lubricating the gearings, and the arms 17b have the function of lubricating the bearings 8. Oil is brought towards the injector 17a to emerge through the end 17c in order to lubricate the gearings. Oil is also brought towards each arm 17b and circulates via the inlet duct 17d of the physical axes 13a of the planetary carrier 13. Oil then circulates through the physical axis 13a in one or more buffer zones 13b to then emerge through the orifices 13c in order to lubricating the bearings 8 of the planetary gears.

FIGS. 3 to 5 represent a planetary carrier 30 of a planetary reduction gear, this planetary carrier 30 could be of the one-piece or cage and cage carrier type, like in the example represented.

The planetary carrier 30 of FIGS. 3 to 5 comprises a cage 34 and a cage carrier 42 connected by bearing connections.

The cage 34 comprises two annular walls 36, 38 perpendicular to the axis X and connected to the outer periphery thereof by a cylindrical wall 40.

The cylindrical wall 40 is here of the double-skin type and comprises an outer skin 40a interrupted by spaces 43 and an inner skin 40b interrupted by the same spaces 43. The outer skin 40a separated by five spaces 43 forms five outer bridge pieces and the inner skin 40b separated by five spaces 43 forms five inner bridge pieces. Each pair of inner and outer bridge pieces form a clevis to receive a finger 44 of the cage carrier 42. In other words, the bridge pieces of each pair together define a housing 46 for receiving a finger 44 of the cage carrier 42. The bridge pieces ensure the structural connection between the walls 36 and 38. Oblong shaped spaces 48 of are produced in at least one of the walls 36 and 38 so as to let the finger 44 pass between the inner and outer bridge pieces.

The cylindrical wall 40 of the cage 34 thus comprises an annular row of housings 46. These housings 46 receive the axial fingers 44 integral with an annular body 50 of the cage carrier 42. The body 50 is located at an axial end of the cage carrier 42. The fingers 44 extend axially from the body 50 and are engaged by axial translation in the housings 46.

The thickness and the width or the radial cross-section of the fingers 44, of the bridge pieces, as well as the diameter of the pins 52 for connecting these fingers to the bridge pieces, are determined by calculation. The remaining space is best occupied between each planetary gear and controlling the thickness/width ratios. The spaces 48 are only the result and have the same width as the space left between the outer and inner bridge pieces.

Each finger 44 comprises, substantially in the middle thereof, a recess 54 for mounting a bearing 56 intended to be passed through by the cylindrical pin 52 carried by the cage 34.

The recess 54 has an orientation substantially radial with respect to the axis X. It has a general cylindrical shape. The cage 34 and the pin 52 have a thickness, measured in a radial direction with respect to the axis X, which is less than the inter-bridge piece distance or the radial thickness of the oblong space 48, so as to be able to engage in this housing together with the finger 44 for supporting these parts.

Each housing 46 is passed through by an pin 52 which has an orientation substantially radial with respect to the axis X. Each pin 52 comprises a cylindrical body connected to an axial end, here radially inner, to a collar 52b. The pin 52 is here engaged by radial translation from the outside through radial orifices of the bridge pieces, the collar 52b thereof being intended to radially bear on a flat face 58 of the outer bridge piece of the cage 34. After insertion of the pin 52 in the orifices of the bridge pieces, until the bearing of the collar 52b on the outer bridge piece, the collar 52b is fixed to this bridge piece, for example, by screwing.

FIGS. 6 to 12 represent a first embodiment of the invention which relates to an assembly comprising a planetary carrier 130 and an elastically deformable annular member 160 for connecting this planetary carrier to a stator element 162 of a turbine engine.

It is therefore understood that the invention applies to a planetary gear train speed reduction gear 110, this type of reduction gear comprising a planetary carrier which is fixed in the engine marker. In the present case, the planetary carrier 130 is connected to the stator element 162 by a flexible connection formed by the member 160.

The stator element 162 is an inlet casing in the example represented. This inlet casing comprises two annular ferrules, respectively outer 162b and inner 162a, extending around one another and about the axis X. The ferrules are connected to one another by arms 164 extending radially with respect to the axis X.

An inlet casing is, like the name thereof says, arranged at the inlet of the engine and more precisely, upstream of a compressor of the turbine engine and generally downstream of the fan S. The ferrules 162a, 162b together define an annular duct for the passage of a gas flow, termed primary flow, to supply the compressor.

In the example represented, the inner ferrule 162a comprises an annular mounting flange 162a1 at the upstream end thereof and an annular mounting flange 162a2 at the downstream end thereof.

The inner ferrule 162a further comprises, at the inner periphery thereof, radial housings 166 for receiving teeth 180 of the cage carrier 142. The housings 166 are here formed in protruding studs 168 located on the radially inner surface of the ferrule. The studs 168 are located over the same circumference centred on the axis X and each comprise an axial notch axially passing through them and opening radially inwards. These notches define the above-mentioned housings 166 which are therefore open in the axial direction, as well as in the radial direction inwards. They are delimited in the circumferential direction by side faces 168a facing the stud 168, as well as by a radially outer face 168b formed by the bottom of the notch (FIG. 11). Each of these faces 168a extends into a plane passing through the axis X.

The member 160 has, in cross-section, a general U-shape of which the opening is oriented radially outwards. This member comprises a first annular flange 170, here upstream, applied axially and fixed on the planetary carrier 130, and a second annular flange 172, here downstream, configured to be applied axially and fixed on the stator element 162 and more precisely, on the flange 162a2 thereof.

The outer periphery of the flange 172 can comprise axial orifices 172a for the passage of fixing means of the screw-nut type, for example. Advantageously, this flange 172 comprises a cylindrical groove 172b oriented downstream and configured to engage with an inner cylindrical surface of the flange 162a2 to ensure the centring of the member 160 opposite the element 162 (FIG. 10).

The outer periphery of the flange 170 can comprise axial orifices 170a for the passage of screws which are screwed into tapped orifices 174 of the planetary carrier 130. Advantageously, the flange 170 comprises a cylindrical groove 170b oriented upstream and configured to engage with an inner surface of the planetary carrier 130 to ensure the centring of the member 160 opposite the planetary carrier 130 (FIG. 10).

The planetary carrier 130 of the type of that represented in FIGS. 3 to 5 and comprises a cage 134 and a cage carrier 142. As mentioned in reference to these figures, the cage carrier 142 comprises an annular body 150 extending about the axis X and carrying a series of protruding fingers 144 extending along the axis X and distributed about this axis X. Each finger 144 comprises, at the free end thereof opposite the body, a recess 154 for mounting a pin 152 for the connection of the cage carrier 142 to the cage 134, this cage 134 comprising, at the periphery thereof, axial housings 146 in which the fingers 144 are received, and which are passed through by the pin 152.

In the embodiment represented, the body 150 furthermore carries a series of protruding teeth 180 extending substantially radially outwards with respect to the axis X, and intended to be housed in the abovementioned housings 166 of the stator element 162. The teeth 180 and the fingers 144 are here part of unitary construction with the body.

The teeth 180 and the tapped orifices 174 are here substantially located in one same plane P1 perpendicular to the axis X (FIGS. 6 and 10). The arms 164 comprise leading and trailing edges arranged respectively in planes P2 and P3 perpendicular to the axis X, the plane P1 being located between these planes P2 and P3'.

Each tooth 180 comprises two opposite side faces 180a, 180b capable of engaging by abutment in the circumferential direction with the side faces 168a facing the stator element 162 (FIG. 11). Each of these faces 180a, 180b extends into a plane passing through the axis X.

As can be seen in FIG. 11, the faces 180a, 180b are not directly in contact with the faces 168a, but are spaced in the circumferential direction of these faces. In the example represented, a pad 182 is attached on each of the faces 180a, 180b, for example in a reinforcement of this face.

The pad 182 has the function of isolating the tooth 180 and therefore the planetary carrier 130 of the stator element 162 to avoid the transmission of vibrations between these operating parts. The pad 182 is advantageously designed to absorb the vibrations to which the planetary carrier is subjected in operation to avoid transmitting them to the element 162. The pad 182 can be made of any material suitable for achieving this function, and for example made of elastomer, composite, etc.

As can be seen in FIG. 11, the radially outer end of each tooth 180 is located at a radial distance from the face 168b such that the tooth can slide in the radial direction into the housing 166. The pads 182 carried by the tooth 180 thus slide over the side faces 168a of the housing 166.

As can be seen in FIGS. 7 to 9, the number of teeth 180 is different from the number of fingers 144. Here, these are 8 teeth 180, and is here greater than the number of fingers 144, which here is 5. Advantageously, the number of teeth 180 is equal to the number of arms 164 of the stator element 162 and the teeth are arranged according to these arms 164. In the example represented in FIG. 9, the teeth 180 are regularly distributed and diametrically opposed two-by-two. It is the same for the arms of the element 162. Each tooth 180 is located in a plane P3 passing through the axis X and each arm is located in a plane P4 passing through the axis X. Each plane P3 is located halfway between two adjacent planes P4. Each plane P4 is located halfway between two adjacent planes P3.

FIGS. 13 and 14 show embodiment variants of the invention, in which the pads 182 are associated (but could be replaced) with absorption oil films. Oil films are thus intended to be formed between the faces 168a, 180a, 180b, or between the pads 182 and the faces 168a. For this, the stator element 162 can comprise an inner duct 190 for the circulation of oil and for supplying oil to the faces 168a, 180a, 180b, as is represented in FIG. 13. In the variant represented in FIG. 14, the planetary carrier 130 comprises an inner duct 192 for the circulation of oil and for supplying oil to the faces 168a, 180a, 180b.

FIG. 10 shows, by way of arrows in a dotted line, the transmission of the operating forces between the planetary carrier 130 and, in particular, the cage carrier 142 and the stator element 162. Forces, in particular, torsion forces, pass from the cage carrier 142 through the member 160, which can be elastically deformed, to the stator element 162. In the case where these forces would exceed a certain threshold and would risk damaging the element 162, the cage carrier 142 would bear in the circumferential direction on the element 162 by way of teeth 180 and studs 168, which would make it possible to transmit these forces directly from the cage carrier to the element 162 without stressing the member 160.

The invention claimed is:

1. An assembly for a turbine engine, said assembly comprising:
    a planetary carrier, said planetary carrier being configured to be mounted in a planetary gear train speed reduction gear, said planetary carrier having an annular shape about an axis X, and
    an annular member,
    said annular member extending about the axis X, said annular member being configured to be fixed to a stator element of the turbine engine and being elastically deformable for ensuring a flexible connection between the planetary carrier and said stator element,
    wherein the planetary carrier carries a series of protruding teeth extending substantially radially outwards with respect to said axis X, each of the series of protruding teeth comprising first opposite side faces which extend in planes passing through the axis X, said first opposite side faces being suitable to come into abutment in a circumferential direction with respect to said axis X with said stator element,
    and wherein vibration absorption planar pads are inserted between said first opposite side faces and said stator element.

2. The assembly according to claim 1, wherein the planetary carrier comprises a cage and a cage carrier.

3. The assembly according to claim 2, wherein the cage carrier comprises an annular body extending about the axis X and comprising the series of protruding teeth, as well as a series of protruding fingers extending along said axis X and distributed about said axis X, each of the series of protruding fingers comprising a recess for mounting a pin for connecting the cage carrier to the cage, the cage comprising axial housings wherein the protruding fingers are received and which are passed through by said pins.

4. The assembly according to claim 3, wherein the protruding teeth and the protruding fingers are at least partially formed of unitary construction with the annular body.

5. The assembly according to claim 1, wherein the planetary carrier comprises an inner duct for circulation of oil and for supplying oil to said first opposite side faces, so as to form an absorption oil film at the level of each of said first opposite side faces.

6. The assembly according to claim 1, wherein said annular member is U-shaped and includes an opening which is oriented radially outwards, the annular member comprising a first annular flange applied axially and fixed on the planetary carrier, and a second annular flange configured to be applied axially and to be fixed on the stator element.

7. The assembly according to claim 1, wherein said vibration absorption planar pads are made of an elastomer or a composite.

8. The assembly according to claim 1, wherein each of said vibration absorption planar pads is in a form of a layer.

9. A turbine engine module, comprising the assembly according to claim 1, and said stator element which comprises two annular ferrules, extending around one another and about said axis X, the annular ferrules being connected to one another by arms, one of the annular ferrules, called inner ferrule, extending at least partially around said planetary carrier and comprising a series of housings which extend radially and which include second side faces, wherein the protruding teeth of the planetary carrier are engaged into the series of housings and are suitable to move radially in the series of housings, and wherein the first opposite side faces are suitable to come into abutment in the circumferential direction on said second side faces of the series of housings.

10. The turbine engine module according to claim 9, wherein said stator element comprises absorption planar pads on said second side faces, and/or an inner duct for circulation of oil and for supplying oil to said second side faces so as to form an absorption oil film between said first opposite side faces and said second side faces.

11. The turbine engine module according to claim 9, wherein said arms comprise leading edges located in a first plane perpendicular to said axis X and trailing edges located in a second plane perpendicular to said axis X, the series of housings and the series of protruding fingers being located in a third plane P1 located between the first plane and the second plane.

* * * * *